United States Patent [19]

Manning

[11] Patent Number: 4,733,755

[45] Date of Patent: Mar. 29, 1988

[54] ANTI-ROLLING DEVICE FOR WHEELCHAIR

[76] Inventor: Donald L. Manning, 4002 Normanwood Dr., Orchard Lake, Mich. 48033

[21] Appl. No.: 64,661

[22] Filed: Jun. 22, 1987

[51] Int. Cl.⁴ .............................................. B60T 1/06
[52] U.S. Cl. ....................................... 188/2 F; 188/31
[58] Field of Search ............... 280/242 WC, 5.22, 5.2, 280/DIG. 10; 188/2 F, 31

[56] References Cited

U.S. PATENT DOCUMENTS

| | | | |
|---|---|---|---|
| 2,425,574 | 8/1947 | Stewack | 188/31 X |
| 3,200,907 | 8/1965 | Hansen | 188/31 |
| 3,259,396 | 7/1966 | Zamotin | 280/242 WC |

Primary Examiner—John A. Pekar

[57] ABSTRACT

The invention relates to a mechanism which can be selectively operated by a wheelchair occupant to insure that the wheelchair will not roll backwards when on an upsloping ramp when the occupant releases both hands from the driving wheels and which mechanism can either be incorporated in a new wheelchair or easily added to an existing wheelchair.

1 Claim, 5 Drawing Figures

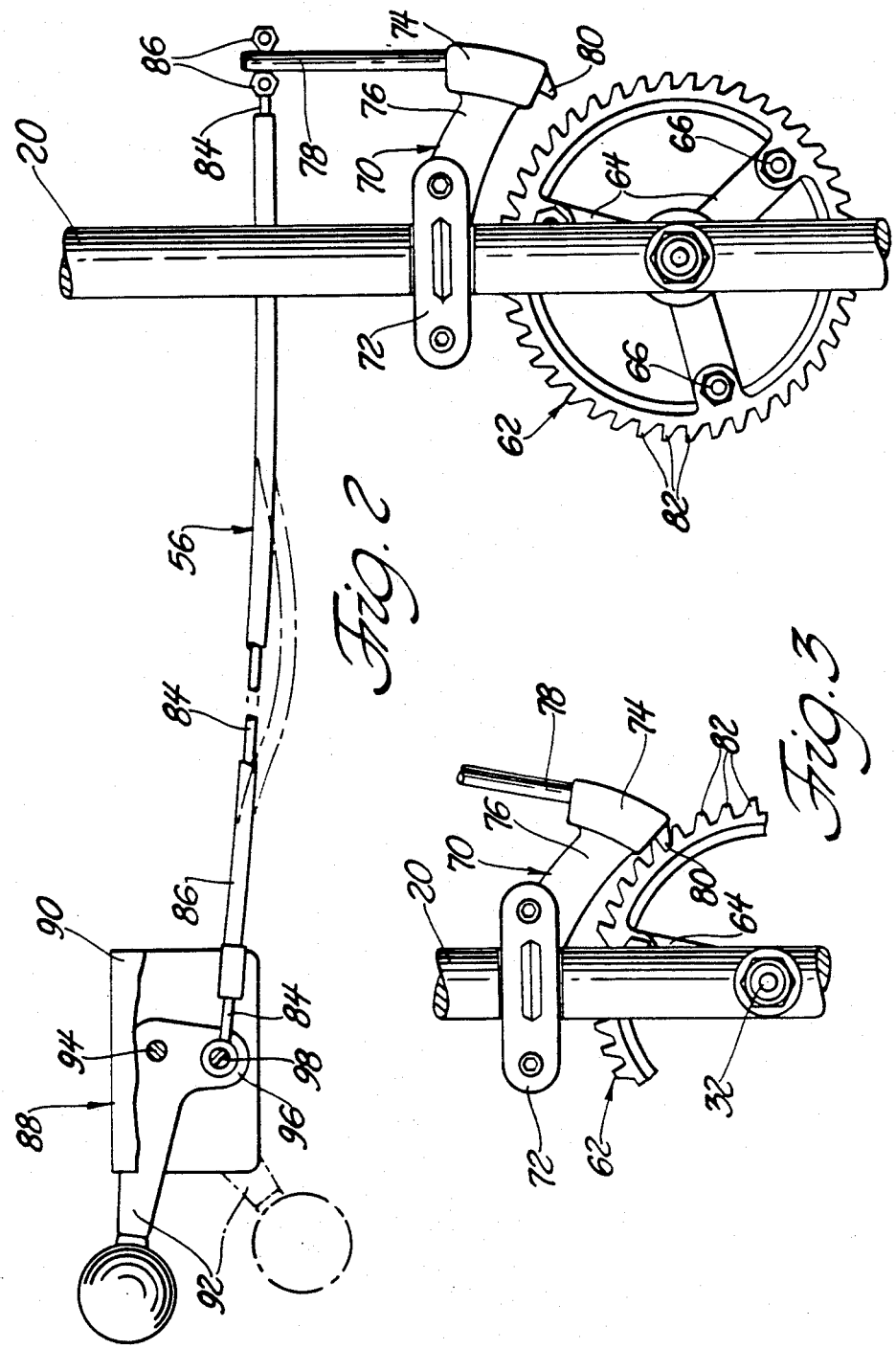

ANTI-ROLLING DEVICE FOR WHEELCHAIR

TECHNICAL FIELD

The present invention is directed to a mechanism which facilitates the propelling of a wheelchair up an incline or ramp. When a wheelchair occupant propels a wheelchair up a ramp there is a tendency of the wheelchair to roll back down the ramp each time the occupant releases the handwheels attached to the main wheels. The present invention relates to a mechanism which can be selectively operated by a wheelchair occupant to insure that the wheelchair will not roll backwards when on an upsloping ramp. The mechanism of the subject invention is such that the wheelchair occupant can release both hands from the driving wheels without any concern that the wheelchair will roll backward down an incline or ramp structure. It is a particular object of the present invention to provide a greatly simplified anti-roll back mechanism which can either be incorporated in a new wheelchair or easily added to an existing wheelchair.

BACKGROUND ART

The problem of preventing the undesired rolling movement of a wheelchair has been previously addressed as is illustrated in the following U.S. patents:

| | |
|---|---|
| 3,104,112 | Crail |
| 3,191,953 | Aysta |
| 3,226,129 | McKinley |
| 3,227,465 | Massie |
| 4,045,047 | Buckley |
| 4,453,729 | Lucken |

While all of the foregoing patents deal with the problem of undesired or uncontrolled movement of a wheelchair, they tend to be difficult or awkward to operate, are part of other wheelchair operating mechanisms and are, therefore, either complicated or difficult to install in a conventional wheelchair.

Applicant has focused on the concept of a simply installed and easily operated mechanism for incorporation in standard type wheelchairs as they exist today. In addition to being simple and therefore easily installed, the mechanism of the present invention is also designed in such a way as to be conveniently and quickly operable by the wheelchair applicant.

DISCLOSURE OF THE INVENTION

The present invention relates to wheelchairs of the type which include a pair of large driving wheels secured to the side frames of a wheelchair and a pair of smaller non-driving wheels also mounted on the side frames forwardly of the main driving wheels. The wheelchair frame also includes a seat portion disposed between the side frames and a back supporting portion also disposed between said side frames. The side frames also include arm rests disposed above the driving wheels as well as a pair of foot supports to enable the occupant's feet to be supported forwardly of the two smaller stabilizing wheels. The conventional wheelchair includes a pair of hand propelling rims respectively fixed to each of the driving wheels and mounted in an outwardly spaced relationship thereto to enable the occupant to grasp the rim and propel the wheelchair either forwardly or rearwardly.

Today it is common, indeed frequently required by law, that public buildings include ramp structures as an alternative to stairs for wheelchair confined individuals. In addition and as shown in my U.S. Pat. No. 4,131,209, buses are now available with ramp structures to facilitate boarding by passengers in wheelchairs. The problem encountered by an occupant in propelling a wheelchair up an incline or ramp is the tendency of the wheelchair to roll back down the ramp when the driving wheel is released by the occupant. Even if only one of the driving wheels is released while the other is firmly held by the occupant, the wheelchair still tends to rotate backwardly about the wheel that is being held. The problem is currently alleviated by most wheelchair occupants by either having someone assist them up the ramp or in propelling themselves by making a series of very quick grasps and releases of the wheel driving rims which can result in very erratic and occupant tiring movement up the ramp or incline structure.

While this problem of unwanted rolling movement of a wheelchair has been recognized, as illustrated in the aforementioned United States patents, no practical and simply installed anti-rolling mechanism is presently available to wheelchair operators.

The overwhelming type of wheelchairs in use today is propelled by the wheelchair occupant in grasping and releasing hand rims attached to the driving wheels which are usually simultaneously grasped to impart a rotation to the driving wheels, released to reposition the occupant's hands and again grasped to continue the rotational action. It is the operation of this type of wheelchair which applicant seeks to improve through the addition of an anti-rolling mechanism. Applicant had two basic objectives in designing his mechanism. First, the anti-roll mechanism must be simply and easily adapted to both new and old wheelchairs. Second, the anti-roll mechanism must be easily actuated from a location where the occupant would normally find or position his hands.

It is most important to note that no modification of the basic wheelchair structure is necessary to incorporate the subject anti-roll mechanism. The anti-roll mechanism may be provided as a kit and installed either on a new wheelchair at the factory, the selling dealers or installed in an already existing wheelchair.

The anti-roll mechanism of the subject invention includes a pair of identical devices located in conjunction with each driving wheel. Accordingly, only one of such devices will be described in detail. Each device includes a slotted plate member adapted to be disposed over the wheel hub adjacent the inner set of wheel spokes. A ratchet gear member is mounted inboard of the wheel and between the wheel and the adjacent side frame so that both the plate and the gear are concentrically disposed about the wheel axis. The plate and gear are secured together through suitable bolt means thereby clamping the gear and plate to an inner wheel spoke flange. A pawl member is pivotally supported to the wheelchair side frame in alignment with the ratchet gear member. The gear member and pawl are so constructed that when the pawl is moved into engagement with the gear, the associated wheel cannot move in a rearward direction. A pawl operating handle is mounted forwardly of the arm rest so as to be easily reached and actuated by the wheelchair occupant. A motion transmitting device, such as a flexible cable, interconnects the pawl operating handle and the pawl whereby the occupant can selectively move the pawl into or out of engagement with the ratchet gear. As with normal pawl and ratchet mechanisms, even when the occupant operates the pawl controlling lever to its anti-rearwardly rolling position, the occupant can propel wheels in a forwardly direction in which case the pawl will simply ratchet or cam over each gear tooth as the wheel is moving in a forwardly direction while engaging the tooth to prevent rearward rotation of the wheel.

The details of the invention will be clearly understood from the following description of a preferred embodiment thereof which is shown in the drawings wherein:

BRIEF DESCRIPTION OF THE DRAWINGS

FIGS. 2 and 3 illustrate the details of the anti-roll mechanism including the pawl being shown both in a disengaged as well as an engaged position with respect to the driving wheel mounted ratchet gear.

DESCRIPTION OF THE PREFERRED EMBODIMENT

Figure 1:
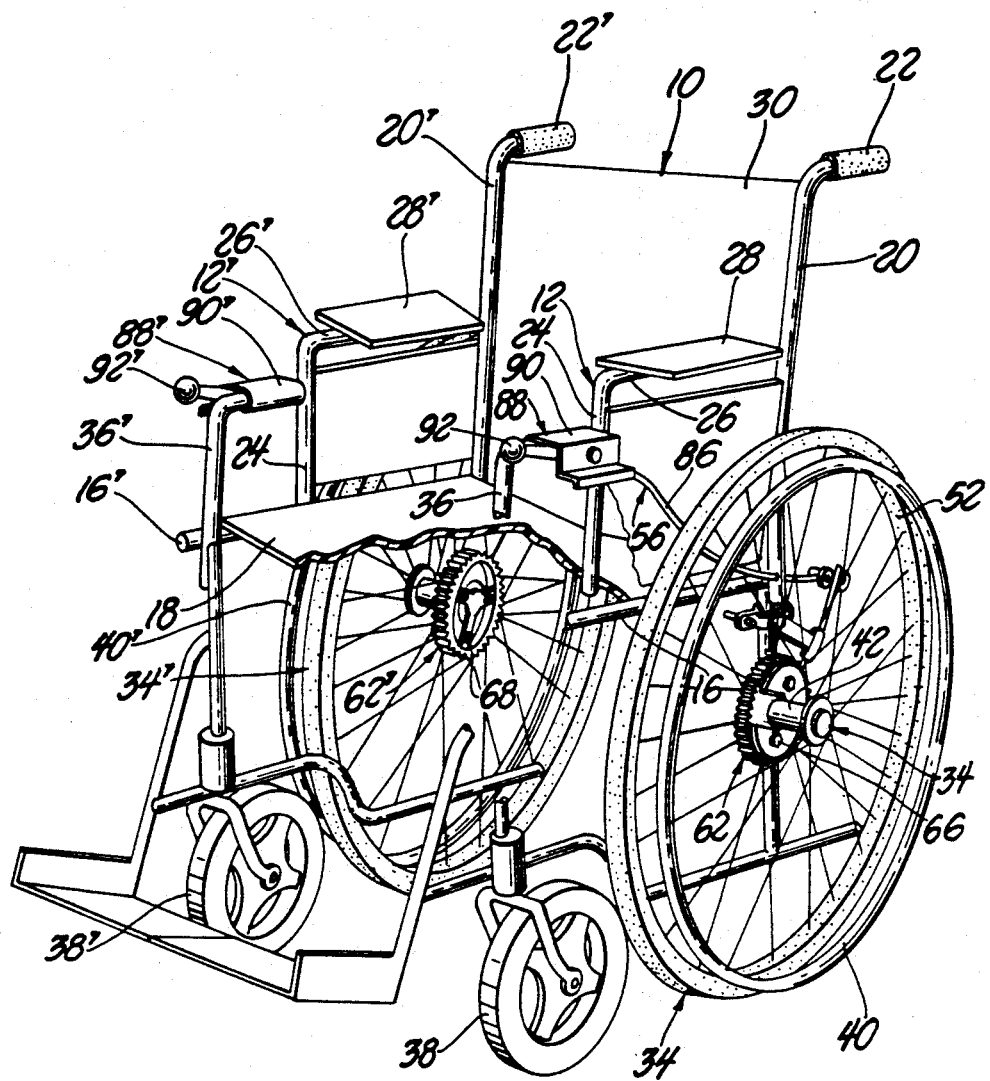
FIG. 1 is a perspective view of a wheelchair incorporating the subject invention.
Figure 4:
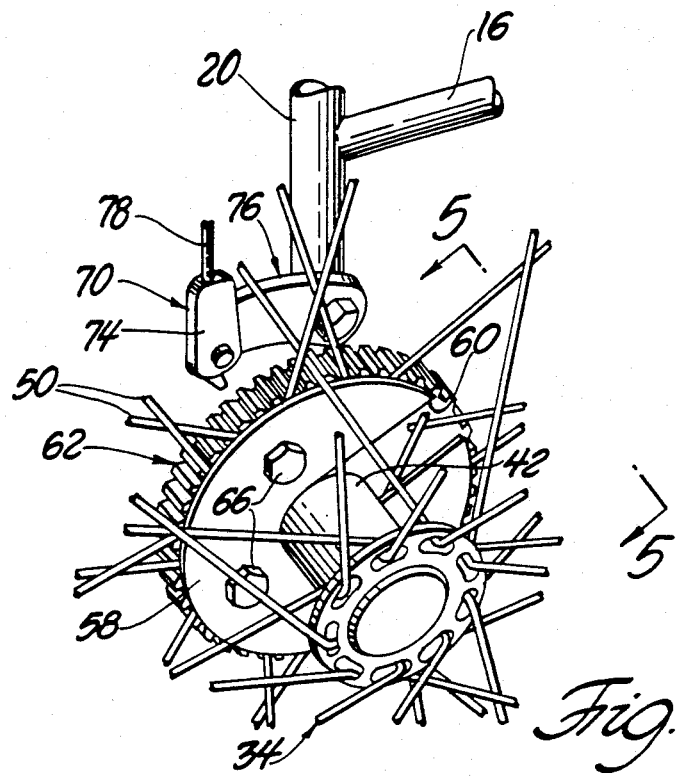
FIG. 4 is an enlarged perspective view of the wheel mounted portions of the anti-roll mechanism.

Except for the anti-roll mechanism which constitutes the subject of the present invention, a conventional wheelchair (10) is shown in FIG. 1. The wheelchair illustrated is of the collapsible type for easy storage or transportation and includes a pair of side frames indicated generally at (12). In as much as the side frames are of identical design only one will be described in detail. The corresponding elements of the other side frame will be indicated with prime numbers. Side frame (12) includes a first element (16) to which one end of a flexible seat member (18) is secured. Element (16) is secured at its rearward end to a generally vertically or upwardly extending element (20) the upper end of which extends rearwardly to provide a handle (22) to enable the wheelchair to be pushed by a second party. The side frame also includes an inverted U-shaped element (24) upon the upper portion (26) of which is mounted an armrest (28). A flexible back supporting element (30) is disposed between the generally vertically extending side frame elements (20). Elements (20) also extend downwardly and includes an axle (32) outwardly cantilevered therefrom and upon which driving wheel (34) is rotatably supported.

Side frame (12) also includes a forwardly and downwardly extending element (36) to the lower end of which is supported a small guide wheel (38) which is freely rotatable about vertical and horizontal axes.

Driving wheel (34) includes a hand ring (40) fixedly mounted thereto and laterally spaced outboard of the wheel. Ring (40) is used by the wheelchair occupant to propel the wheelchair forwardly or rearwardly.

Figure 5:
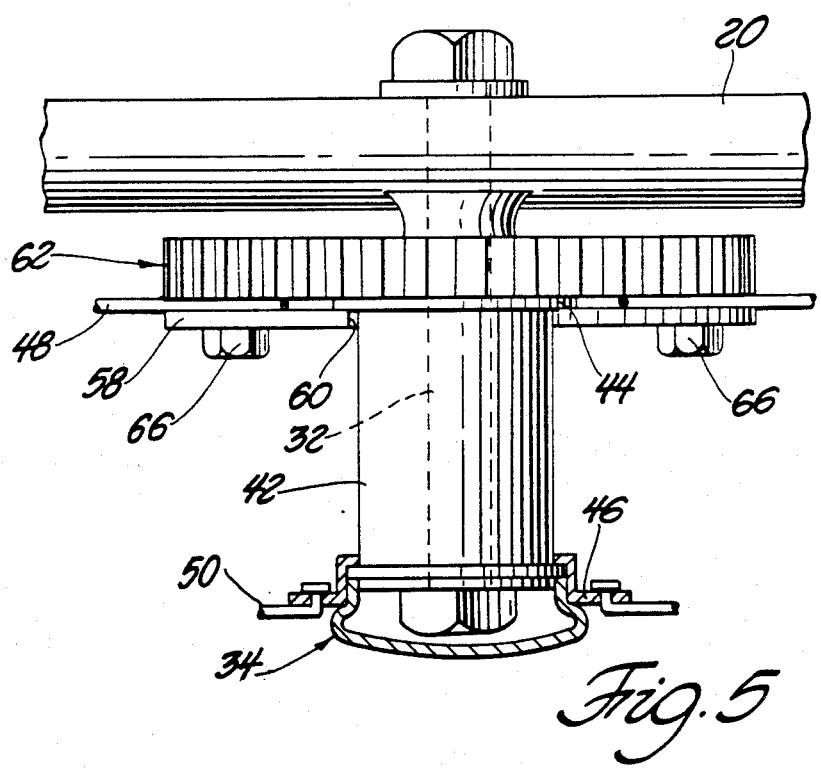
FIG. 5 is a cross-sectional view through the wheel taken along line 5—5 of FIG. 4.

As best seen in FIG. 5, wheel (34) includes a hub (42) having a pair of laterally spaced hub flanges (44) and (46). Each wheel (34) includes inner and outer sets of spokes (48) and (50) respectively secured at their inner ends to hub flanges (44) and (46) and at their outer ends to the wheel rim (52).

ANTI-ROLL MECHANISM

An anti-rearward rolling mechanism is provided for each wheel and is indicated generally at (56). Mechanism (56) includes a plate (58) having a radial slot (60) adapted to slide over wheel hub (42). As best seen in FIG. 5, plate (58) is adapted to abut against inner hub flange (44) and the inner set of spokes (48). A ratchet gear element (62) is coaxially mounted on wheel axle (32) inboard of wheel (34). Ratchet gear element (62) includes flat radial spoke members (64) also adapted to abut against inner hub flange (44). A plurality of bolt members (66) extend through suitable openings in plate member (58) and ratchet gear element spokes (64) and are engaged by suitable nut members (68) to secure the plate and ratchet gear element together and in abutting relationship with inner hub flange (44).

A pawl device is indicated generally at (70) and includes a bracket member (72) clampingly engaged to vertically extending side frame member (20) and vertically disposed above the ratchet gear element (62). A pawl element (74) includes first and second outwardly projecting arms (76) and (78). Arm (76) is pivotally secured to bracket (72) such that a pawl element tooth (80) may be moved into and out of engagement with the teeth (82) of ratchet gear element (62). As indicated in FIGS. 2 and 3, pall arm (78) is disposed generally normal to pawl arm (76) and is connected at its upper end to an actuating cable member (84). A pair of clamping screw elements (86) secures operating cable (84) to pawl arm (78). Cable (84) is slidably disposed in a suitable flexible casing (86). The inner most end of casing (86) is suitably secured to side frame element (20).

A pawl or detent operating mechanism is indicated generally at (88) and is suitably mounted on side frame member (36) forwardly of arm rest (28) and within easy reach of the wheelchair occupant's hands. The pawl operating mechanism includes a bracket (90) clamped or otherwise suitably secured to side frame member (36). The forward end of flexible casing (86) is fixed to bracket (90). A lever (92) is pivotally secured to bracket (90) through a suitable pin member (94). Lever (92) includes an offset portion (96) to which the forward end of the flexible cable (84) is secured through a clamping device (98).

With lever (92) in its upward position, as shown in FIG. 2, flexible cable (84) is moved forwardly to rotate the pawl element (74) in a counterclockwise direction away from ratchet gear element teeth (82). In this position the wheelchair may be freely propelled forwardly or rearwardly. In the event the wheelchair occupant wishes to prevent the wheelchair from moving in a rearwardly direction, as when being propelled up a ramp or incline surface, lever (92) is moved to its downward position, shown in dotted lines in FIG. 2, to rotate the pawl element tooth (80) into meshing engagement with the ratchet gear element as shown in FIG. 3. In this position, the wheelchair may be propelled forwardly and in which case the rearwardly sloping teeth (82) of the ratchet gear element will cause the forwardly sloping tooth (80) of the pawl element to be cammed in a counterclockwise direction and out of engagement with the rearwardly adjacent tooth. This counterclockwise or ratcheting movement of pawl element (74) during the forward movement of the wheelchair will not cause lever (92) to be moved from its downward position to its upward position, rather, such ratcheting movement of the pawl element will simply cause flexible cable (84) and casing (86) to bow between its respective ends. Such bowing of the casing and cable is indicated by the dash lines in FIG. 2. While the wheelchair may be propelled forwardly with lever (92) in its downward position, the pawl element tooth engagement with the flat backsides of the ratchet gear element teeth (82) prevents any rearward movement of the wheelchair. Thus, the wheelchair occupant can release both hands from the hand rings (40) and the wheelchair will automatically hold its position on an incline or ramp. This operation then enables the wheelchair occupant to easily and leisurely reposition his or her hands on the wheel driving rings to continue the forward propelling movement of the wheels up the ramp or incline.

It is to be understood that both operating levers (92—92') on either side of the wheelchair side frames should be operated in unison for the normal operation of the wheelchair. In other words, if only one of the operating levers was moved to its downward or antirolling position, while the other lever remained in its upward or disengaged position, the disengaged wheel would roll backwardly causing the wheelchair to pivot about the locked wheel.

It is to be understood that other variations of the subject invention are possible within the scope of the hereinafter appended claims.

What is claimed is:

1. A wheelchair of the type including an occupant supporting frames (12 and 14) having seat (18) and back (30) portions, arm rests (28) extending forwardly from said back portion and disposed above the seat portion, axle shaft means (32—32') secured to and projecting laterally outboard of each side of said frame, a pair of main wheels (34—34'), each wheel including a hub (42—42') having axially spaced spoke flanges (44 and 46—44' and 46'), two sets of spokes (48 and 50—48' and 50') respectively connected at their radially inner ends to said flanges and at their outer ends to a wheel rim (52—52'), each hub respectively rotatably mounted on the outwardly projecting portion of said axle shaft means and a mechanism (56 and 88—56' and 88') for selectively locking said wheels against undesired rearward rotation, the improvement in said mechanism comprising:
   A. ratchet gear members (62 and 62') concentrically disposed about said axle shaft means intermediate said frame and the axially inner hub flanges (44 and 44');
   B. plate members (58 and 58') concentrically disposed about the wheel hubs intermediate the hub flanges (44—44'); each plate member (58—58') includes radial slot (60—60') which enables the plate to be concentrically mounted on the wheel hub;
   C. fastener means (66-68') for securing the plate and gear members in clampingly abutting relation with the axially inner hub flanges;
   D. pawl elements (74-80 and 74'-80') pivotally mounted on said frames and adapted to engage the ratchet gear members to prevent said wheels from rotating in a rearwardly direction; and
   E. means (92, 92', 84, 86, 84' and 86') for selectively retaining said pawl elements out of engagement with said ratchet gear elements to allow rearward rotation of said wheels.

* * * * *